US008548741B2

(12) United States Patent
Koehrsen et al.

(10) Patent No.: US 8,548,741 B2
(45) Date of Patent: Oct. 1, 2013

(54) FLEET TRACKING SYSTEM HAVING UNICAST AND MULTICAST FUNCTIONALITY

(75) Inventors: Craig L. Koehrsen, East Peoria, IL (US); Darryl V. Collins, Jindalee (AU); Bryan J. Everett, Peoria, IL (US)

(73) Assignee: Catepillar Inc., Peoria, IL (US)

( * ) Notice: Subject to any disclaimer, the term of this patent is extended or adjusted under 35 U.S.C. 154(b) by 128 days.

(21) Appl. No.: 13/173,886

(22) Filed: Jun. 30, 2011

(65) Prior Publication Data

US 2013/0006468 A1 Jan. 3, 2013

(51) Int. Cl.
*G01C 21/26* (2006.01)
*G01C 21/20* (2006.01)

(52) U.S. Cl.
USPC .......... 701/482; 701/36

(58) Field of Classification Search
USPC .......... 701/36, 482
See application file for complete search history.

(56) References Cited

U.S. PATENT DOCUMENTS

| | | | | |
|---|---|---|---|---|
| 5,519,621 | A | 5/1996 | Wortham | |
| 6,006,159 | A | 12/1999 | Schmier et al. | |
| 6,892,131 | B2 * | 5/2005 | Coffee et al. | 701/482 |
| 7,394,403 | B2 | 7/2008 | Winkler et al. | |
| 7,421,334 | B2 | 9/2008 | Dahlgren et al. | |
| 2007/0281689 | A1 * | 12/2007 | Altman et al. | 455/435.1 |
| 2008/0255754 | A1 | 10/2008 | Pinto | |
| 2008/0268838 | A1 * | 10/2008 | Zufall et al. | 455/430 |
| 2009/0259400 | A1 * | 10/2009 | Coats et al. | 701/301 |
| 2010/0127853 | A1 | 5/2010 | Hanson et al. | |

OTHER PUBLICATIONS

U.S. Patent Application of Craig L. Koehrsen et al. entitled "Fleet Tracking Method Using Unicast and Multicast Communication" filed on Jun. 30, 2011.
Real-Time Spatial Monitoring of Vehicle Vibration Data as a Model for TeleGeoMonitoring Systems by Jeff Robidoux, URL site http://scholar.lib.vt.edu/theses/available/etd-05092005-123406/unrestricted/Robidoux_MS_Thesis.pdf (May 2005).

* cited by examiner

*Primary Examiner* — Mary Cheung
*Assistant Examiner* — Michael Berns
(74) *Attorney, Agent, or Firm* — Finnegan, Henderson, Farabow, Garrett & Dunner, LLP

(57) ABSTRACT

A tracking system is disclosed for use with a fleet of machines operating at a common worksite. The tracking system may have a locating device located onboard each machine of the fleet of machine that is configured to determine a current location of an associated machine of the fleet of machines, and a communicating device located onboard each machine in communication with the locating device. The tracking system may also have a central controller located offboard the fleet of machines in communication with each communicating device. The central controller may be configured to receive an unacknowledged message from each communicating device relaying the current location of the associated machine. The central controller may also be configured to update a location listing of the fleet of machines with the current location, and to repetitively multicast the location listing to the communicating devices of the fleet of machines.

20 Claims, 3 Drawing Sheets

FLEET TRACKING SYSTEM HAVING UNICAST AND MULTICAST FUNCTIONALITY

TECHNICAL FIELD

The present disclosure relates generally to a tracking system, and more particularly, to a fleet tracking system having unicast and multicast functionality.

BACKGROUND

Mobile machines such as haul trucks, scrapers, wheel loaders, and other types of heavy machinery are used to perform a variety of tasks. During the performance of these tasks, the machines often operate in conjunction with a limited resource, for example a haul road, a loading machine such as an excavator or front shovel, or a processing; machine such as a crusher or screen. When operating in conjunction with a limited resource, operation of a mobile machine relative to the resource and to other mobile machines competing for the same resource should be carefully managed to avoid machine collisions and to increase profit. The need to properly manage the machines can become even more important when the machines are autonomously or semi-autonomously controlled.

Historically, each machine would determine its own position at the worksite, and relay this position to a central computer. The central computer, after receiving a position message from a particular machine, would then confirm receipt of the message with a return message to that machine. The machine sending the original message would then check the returned confirmation message to make sure that the original message had been properly sent and received, and send an additional message if any errors in transmission were detected. When confirmation of the original message is made by both the machine and the central computer, the central computer would update a map at the worksite, and relay the map to the machine that sent the original message for use in controlling the machine. Similar confirmation messages regarding transmission of the map would then be generated. Although adequate for some applications, the number of messages sent between machines and the central computer were excessive and required large transmission bandwidths and computing power at the worksite.

An alternative method for communicating messages is described in U.S. Pat. No. 6,006,159 (the '159 patent) issued to Schmier et al. on Dec. 21, 1999. In particular the '159 patent describes a public transit vehicle arrival information system. The system includes global position determining devices located in different public transportation vehicles for determining the locations of the vehicles along their defined routes. A central computer is coupled to the global position determining devices for receiving the locations of the vehicles therefrom. The computer is programmed to compute and update from the present locations, a transit data table. The transit data table is then made available for public access via pagers, notebooks, computers, and telephones.

Although the system of the '159 patent may be able to receive and transmit location information with a reduced number of messages, it may still be less than optimal. In particular, the system of the '159 patent may be unable to ensure that reliable information is received from and relayed to particular users of the system at a desired frequency. Without this functionality, the system of the '159 patent may not be applicable to fleet operations where machine control can be affected by the information.

The disclosed tracking system is directed to overcoming one or more of the problems set forth above and/or other problems of the prior art.

SUMMARY

In one aspect, the present disclosure is directed to a tracking system for use with a fleet of machines. The tracking system may include a locating device located onboard each machine of the fleet of machines that is configured to determine a current location of an associated machine of the fleet of machines, and a communicating device located onboard each machine in communication with the locating device. The tracking system may also include a central controller located onboard the fleet of machines in communication with each communicating device. The central controller may be configured to receive an unacknowledged message from each communicating device relaying the current location of the associated machine. The central controller may also be configured to update a location listing of the fleet of machines with the current location, and to repetitively multicast the location listing to the communicating devices of the fleet of machines.

In another aspect, the present disclosure is directed to another tracking system for use with a fleet of machines. This fleet tracking system may include a locating device located onboard each machine of the fleet of machine and being configured to determine a current location of an associated machine, and a communicating device located onboard each machine in communication with the locating device. The fleet tracking system may also include a central controller located offboard the fleet of machines in communication with each communicating device. The central controller may be configured to repetitively receive an unacknowledged message from each communicating device relaying the current location of the associated machine, update a plurality of different location listings of the fleet of machines with the current location, and repetitively multicast each of the plurality of different location listings to particular communicating devices based on co-location of the associated machines within particular regions of the worksite.

DETAILED DESCRIPTION

Figure 1:
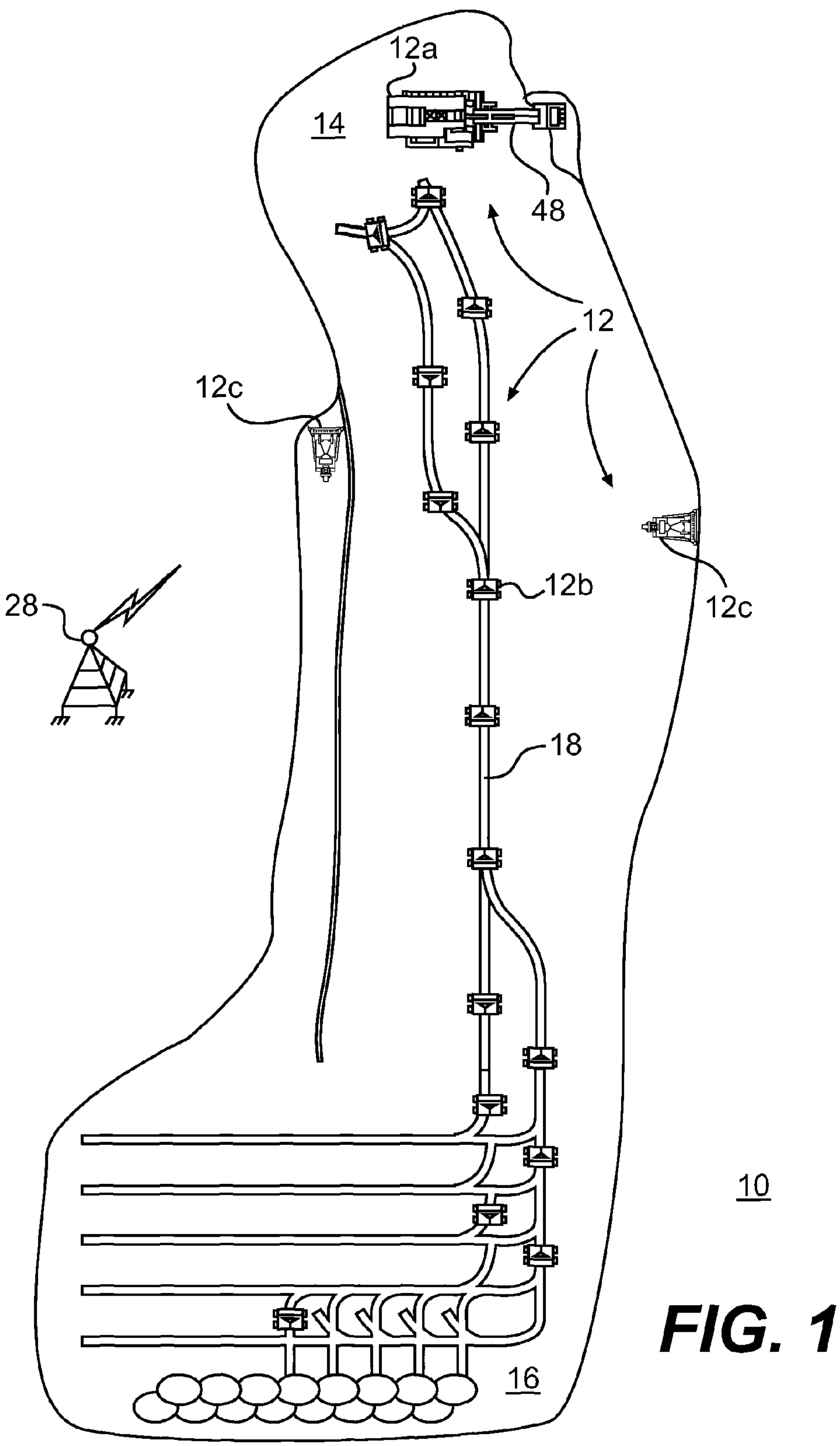
FIG. 1 is a pictorial illustration of an exemplary disclosed worksite.

FIG. 1 illustrates an exemplary worksite 10 having multiple, simultaneously-operable machines 12 performing a variety of predetermined tasks. Worksite 10 may include, for example, a mine site, a landfill, a quarry, a construction site, or any other type of worksite known in the art. The predetermined tasks may be associated with altering the current geography at worksite 10 and include a clearing operation, a leveling operation, a hauling operation, a digging operation, a loading operation, or any other type of operation that functions to alter the current geography at worksite 10.

Worksite 10 may include multiple locations designated for particular purposes. For example, a first location 14 may be designated as a load location at which a mobile loading machine 12*a* or other resource operates to fill multiple mobile haul machines 12*b* with material. For the purposes of this disclosure, a resource may be defined as a worksite asset shared by multiple machines for the completion of an assigned task. A second location 16 may be designated as a dump location at which machines 12*b* discard their payloads. Machines 12*b* may follow a travel path 18 that generally extends between load and dump locations 14, 16. One or more other mobile dozing or grading machines 12*c* at worksite 10 may be tasked with clearing or leveling load location 14, dump location 16, and/or travel path 18 such that travel by other machines 12 at these locations may be possible. As machines 12 operate at worksite 10, the shapes, dimensions, and general positions of load location 14, dump location 16, and travel path 18 may change. Machines 12 may be self-directed machines configured to autonomously traverse the changing terrain of worksite 10, manned machines configured to traverse worksite 10 under the control of an operator, or semi-autonomous machines configured to perform some functions autonomously and other functions under the control of an operator. In the disclosed embodiment, at least some of machines 12 at worksite 10 are autonomously or semi-autonomously controlled.

Figure 2:
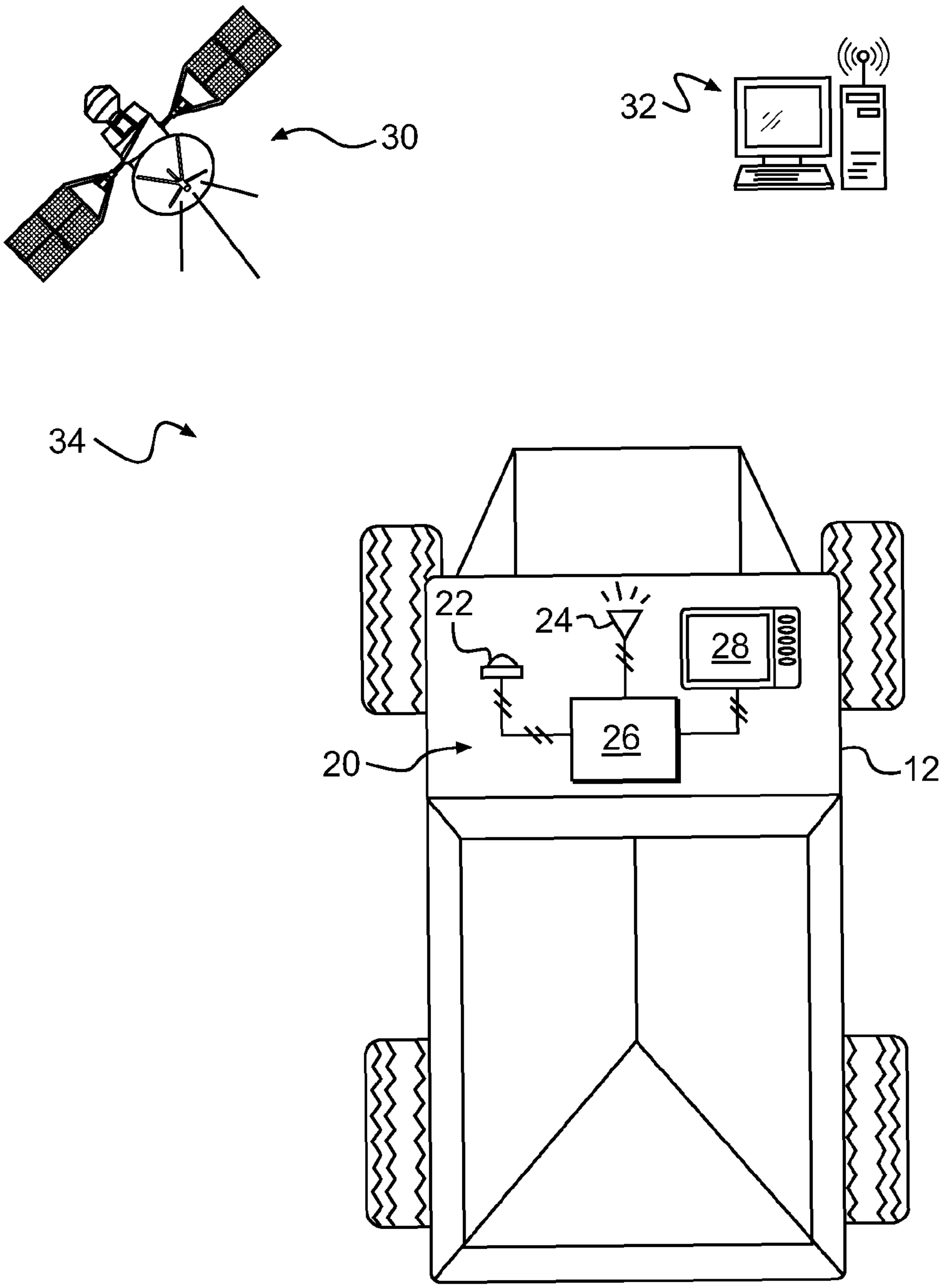
FIG. 2 is pictorial illustration of an exemplary disclosed tracking system that may be used at the worksite of FIG. 1.

As shown in FIG. 2, each machine 12 may be equipped with a control module 20 that facilitates or enhances autonomous and/or human control of machine 12. Control module 20 may include, among other things, a locating device 22, a communicating device 24, and an onboard controller (OC) 26 connected to locating device 22 and communicating device 24. When intended for use with a manually operated machine 12, control module 20 may also include one or more operator interface devices 28. Operator interface devices 28 may include, for example, an input device such as a joystick, keyboard, steering wheel, pedal, lever, button, switch, etc. Alternatively or additionally, operator interface devices 28 may include a display device such as a monitor, if desired.

Locating device 22 may be configured to determine a position of machine 12 and generate a position signal indicative thereof. Locating device 22 could embody, for example, a Global Positioning System (GPS) device configured to interact with an array of satellites 30 (only one shown in FIG. 2), an Inertial Reference Unit (IRU), a local tracking system, or any other known locating device that receives or determines positional information associated with machine 12. Locating device 22 may be configured to convey a signal indicative of the received or determined positional information to OC 26 for processing. It is contemplated that the position signal may also be directed to one or more of interface devices 28 (e.g., to the monitor) for display of machine location in an electronic representation (i.e., a map) of worksite 10, if desired.

Communicating device 24 may include hardware and/or software that enables sending of data messages between OC 26 and an offboard central controller (OCC) 32. OCC 32, together with each control module 20 of machines 12, may embody a tracking system 34. The data messages associated with tracking system 34 may be sent and received via a direct data link and/or a wireless communication link, as desired. The direct data link may include an Ethernet connection, a connected area network (CAN), or another data link known in the art. The wireless communications may include satellite, cellular, infrared, and any other type of wireless communications that enable communicating device 24 to exchange information between OCC 32 and the components of control module 20.

Based on information from locating device 22 and/or instructions from OCC 32, each OC 26 may be configured to help regulate movements and/or operations of its associated machine 12 (e.g., direct movement of associated traction devices, work tools, and/or actuators; and operations of associated engines and/or transmissions). OC 26 may be configured to autonomously control these movements and operations or, alternatively, provide instructions to a human operator of machine 12 regarding recommended control. OC 26 may also be configured to send operational information associated with components of machine 12 offboard to OCC 32 via communicating device 24, if desired. This information may include, for example, the coordinates of machine 12, a traction device speed and/or orientation, tool and/or actuator positions, communication and/or operational status information (e.g., turned off, inactive, etc.), and other information known in the art.

OC 26 may embody a single or combination of multiple microprocessors, field programmable gate arrays (FPGAs), digital signal processors (DSPs), etc., that are capable of controlling operations of machine 12 in response to operator requests, built-in constraints, sensed operational parameters, and/or communicated instructions from OCC 32. Various known circuits may be associated with these components, including power supply circuitry, signal-conditioning circuitry, actuator driver circuitry (i.e. circuitry powering solenoids, motors, or piezo actuators), and communication circuitry.

OCC 32 may include any means for monitoring, recording, storing, indexing, processing, and/or communicating various operational aspects of work worksite 10 and machines 12. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

OCC 32 may be configured to execute instructions stored on computer readable medium to perform methods of tracking the movement and status of machines 12 at worksite 10. That is, as described above, the operation of machines 12 may cause changes to the geography of worksite 10 and, in order for machines 12, particularly those machines that are autonomously or semi autonomously controlled, to adapt to the changing geography and/or to the movement of other machines 12 at worksite 10, the travel and status of each machine 12 should be carefully tracked and communicated to all machines 12. OCC 32 may execute instructions to perform a method of tracking that involves receiving frequently repeated unicast messages from individual machines 12, updating a location listing of all machines 12 at worksite 10 based on the unicast messages, and frequently multicasting the updated location listing to all machines 12. In the disclosed embodiment, few, if any, of the unicast or multicast messages may be acknowledged by either individual machines 12 or by OCC 32, thereby providing for a reduction in required communication bandwidth and/or computing power.

Figure 3:
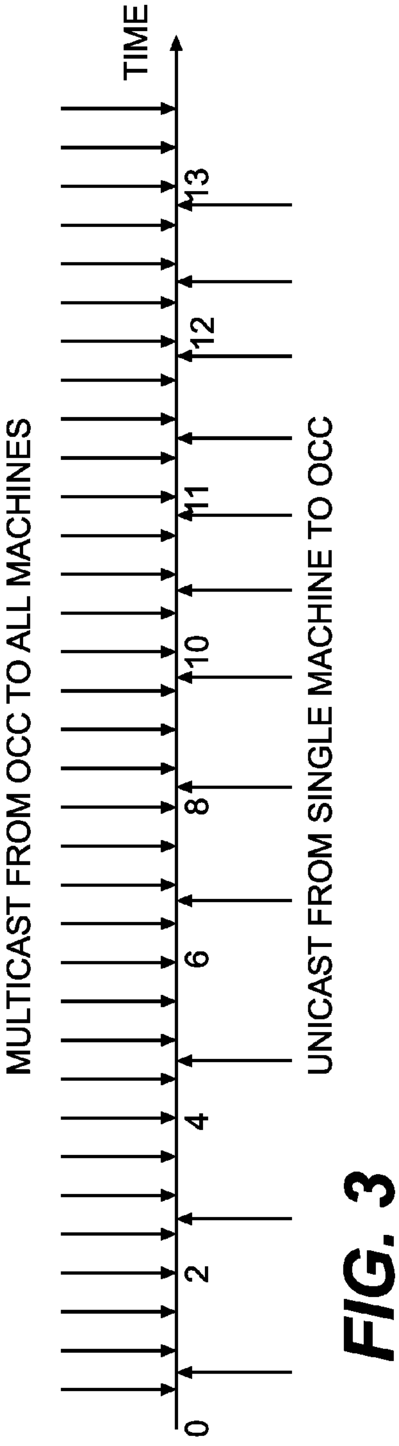
FIGS. 3-4 are communication charts depicting exemplary operations performed by the tracking system of FIG. 2.
Figure 4:
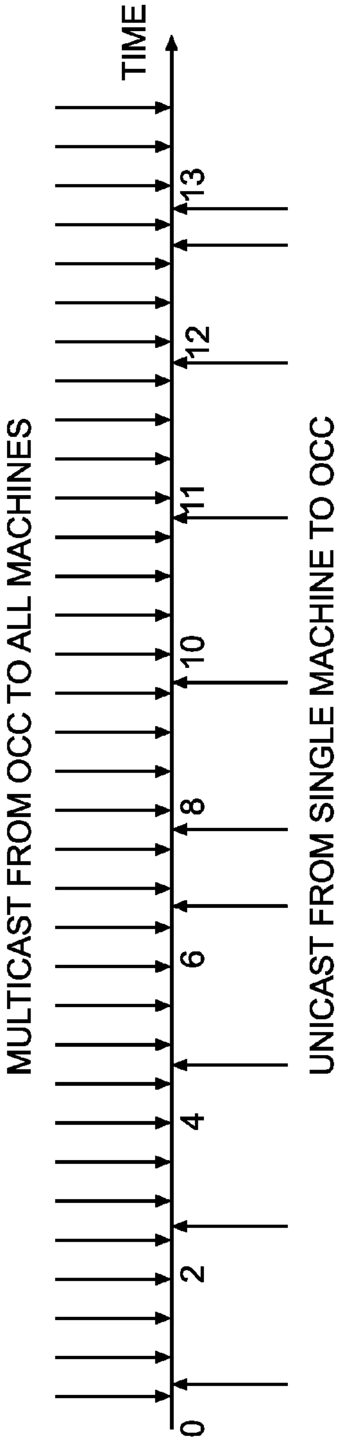

FIGS. 3 and 4 illustrate exemplary operations performed by tracking system 34. FIGS. 3 and 4 will be described more in the following section to further illustrate the disclosed concepts.

Industrial Applicability

The disclosed tracking system may be applicable to any venture where a fleet of machines operate together at a common worksite. Although applicable to any type of machine, the disclosed control system may be particularly applicable to autonomously or semi-autonomously controlled machines where the machines are at least partially controlled to follow a particular travel path and/or perform a particular function. The disclosed system may track the movement and status of each individual machine, repetitively update this information, and multicast the updated information to all machines at the worksite. In this manner, decisions regarding control of the machines can be based on a continuous flow of reliable information.

As shown in FIG. 3, each machine 12 may repetitively send (i.e., send at substantially regular intervals), via communicating device 24, a position message to OCC 32 providing OCC 32 with a current position of machine 12 at worksite 10. In some embodiments, the position message may also include identification of machine 12 (e.g., identification number, type, size, payload, etc.) and a communication and/or operational status of machine 12. The position messages may be sent at intervals having a minimum frequency, for example every 2 seconds (shown in the lower-left side of the chart in FIG. 3 corresponding with the first 7 seconds of tracked messages). It is contemplated, however, that a speed of machine 12 may have an effect on the frequency of the messages sent from machines 12 to OCC 32. That is, the frequency may increase in relation to an increasing speed of machine 12, after the speed of machine 12 has exceeded a threshold speed (shown in the lower-right side of the chart in FIG. 3 corresponding with last 6 seconds of tracked messages). For example, the messages may be sent each time machine 12 moves a particular distance (e.g., about 110 meters) or every 2.0 seconds, which ever comes first. In this manner, a higher speed of machine 12 may result in the position messages being sent more frequently than the minimum threshold frequency. It is also contemplated that a proximity of machine 12 to other machines 12 at worksite 10 may have an effect on the frequency of the messages being sent to OCC 32. For example, as two machines 12 move closer to each other, both machines 12 may increase the frequency at which their position messages are sent to OCC 32.

The position messages sent by communicating devices 24 to OCC 32 may be unacknowledged messages. That is, OCC 32 may not send a confirmation message back to each communicating device 24 acknowledging receipt of each position message. Instead, as will be described in more detail below, each OC 26 may be required to determine for itself that each position message has been correctly received by OCC 32 based on subsequent location listing messages multicast by OCC 32 to all machines 12 at worksite 10.

OCC 32 may receive the position messages from communicating devices 24 of all machines 12 at worksite 10, update a location listing of all machines 12 based on the position messages, and multicast the location listing to all machines 12 at worksite 10. OCC 32 may multicast the location listing at a minimum frequency that is greater than the frequency of the position messages unicast by OC 26 from each machine 12 (i.e., the location listing messages may be multicast more often than the unicast position messages). For example, the location listing messages may be multicast about every 0.5 seconds (shown in the upper half of FIGS. 3 and 4).

The message multicast by OCC 32 may include a listing of the most recent locations of all machines 12 that are actively operating at worksite 10. In some embodiments, the location may also include the locations of stationary objects, for example infrastructure at worksite 10. It is contemplated that OCC 32 may further be capable of unicasting messages to individual machines 12, if desired. These unicast messages may include, for example, instructions and/or recommendations regarding control of the individual machines 12.

After receiving the location listing from each multicast message, OC 26 of each machine 12 may update an electronic map of worksite 10 stored within the memory of OC 26, and display the map on interface device 28. In addition, OC 26 may be configured to affect autonomous operation of machine 12 and/or provide instructions or recommendations to an operator of machine 12 based on the updated map.

Every time the location listing is received from OCC 32 by each individual communicating device 24, the associated OC 26 may check the location listing to confirm that the position message most recently sent by the corresponding communicating device 24 was correctly received and multicast back by OCC 32. That is, each OC 26 may be configured to store in memory the most recently unicast position of its corresponding machine 12, along with a corresponding time stamp. Then, upon receiving a subsequent location listing in the multicast message from OCC 32, each individual OC 26 may compare both the current position listed for its associated machine 12 and a time stamp from OCC 32 for that position with the information stored in memory.

When the listed position of its associated machine 12 and/or the time stamp of that listed position do not match the information stored in memory, OC 26 may determine that the position message previously unicast to OCC 32 was not correctly received (i.e., not received at all or received with error), and cause communicating device 24 to immediately send a new unicast message to OCC 32 that includes the current location of its associated machine 12. In an alternative embodiment, OC 26 may wait a threshold amount of time before sending the new unicast message to OCC 32, for example an amount of time that allows for confirmation from two or more multicast messages that the previous position message was not received correctly. This behavior may correspond, for example, with a tracked time of about 7 seconds in the chart of FIG. 4. If OC 26 determines that the position messages are not being received correctly after multiple attempts to resend the messages, OC 26 may determine that tracking system 34 has malfunctioned. This behavior may correspond, for example, with a tracked time of about 13 seconds in the chart of FIG. 4.

When OC 26 determines that tracking system 34 has malfunctioned, OC 26 may implement corrective action. In the case of autonomous or semi-autonomous machines 12, OC 26 may continue to operate for a set period of time, for example about 20 seconds, and then initiate machine shutdown procedures. In addition, OC 26 may develop exclusionary zones around other machines 12 at worksite 10, for example around any manned machines 12. When OC 26 determines that the associated machine 12 has entered any of the exclusionary zones, the corrective action may be implemented, regardless of the time expired since loss of contact, in one embodiment, the exclusionary zones may expand over time, for as long as tracking system 34 is determined to be malfunctioning.

OCC 32 may be configured to determine when a particular machine 12 is out of contact based on the frequency of position messages being received from that machine 12. In particular, when a position message from a particular machine 12 (i.e., from the communicating device 24 of that machine 12) has not been received for at least at threshold period of time, OCC 32 may determine that it is not currently possible for the machine 12 to send the position message, and indicate in the location listing that the particular machine 12 is out of contact. In one embodiment, the threshold period of time may be about 5 seconds.

When a particular machine 12 receives the multicast message from OCC 32 indicating that the machine 12 is out of contact, OC 26 of that machine 12 may immediately unicast a position message with the current location of the machine 12. If the machine 12 continues to receive the same indication in the multicast message, even after unicasting the additional position message(s), OC 26 of that machine 12 may then implement the same corrective action described above or another corrective action known in the art.

OCC 32 may be configured to determine a long-term communication status of each machine 12, and include the communication status in the message multicast to all machines 12 (i.e., in the location listing sent to all machines 12). The long-term communication status may include, among other things, whether communicating device 24 is turned "on" or "off". OCC 32 may determine that a particular communicating device 24 is turned "on" or "off" based on comparison of an actual frequency of position messages from the communicating device 24 relative to an expected frequency. In particular, when OCC 32 stops receiving messages from communicating device 24, and the position messages do not restart within a threshold time period, OCC 32 may indicate within the location listing that the status of the corresponding machine 12 is "off". After listing the status of a particular machine 12 as being "off" for an amount of time, OCC 32 may stop including the machine 12 in the listing altogether. Upon receiving a subsequent position message from the particular machine 12, OCC 32 may restart listing the machine and/or adjust the status in the location listing accordingly.

During monitoring of the location listing multicast by OCC 32 to all machines 12, each OC 26 may also scrutinize information regarding other machines 12. For example, each OC 26 may continually check a status and location of all machines 12 at worksite 10, so as to adjust operation of its corresponding machine 12 based on proximity to and/or trajectory of itself relative the trajectories of the other machines 12. During this monitoring, situations may arise where information in the location listing stored in the memory of OC 26 does not match information in the location listing multicast by OCC 32. For example, the status stored in memory for a particular machine 12 may not match the status in the location listing for that machine 12. In this situation, OC 26 may be configured to query OCC 32 regarding the status of the particular machine 12. In response to the query, OCC 32 may be configured to unicast to the querying OC 26 or multicast to all machines 12, a status confirmation and/or instructions regarding the particular machine 12.

OC 26 of each machine 12 may be configured to perform different operations based on information included in the location listing regarding other machines of interest to its associated machine 12 (i.e., regarding a subset of the machines 12 at worksite 10). The other machines of interest may include other machines 12 within a threshold proximity to the machine 12 of OC 26. OC 26 may determine which machines 12 are machines of interest based on a simple 2-dimensional comparison of locations of the other machines 12 (as included in the location listing) with interest zone boundaries stored in memory. OC 26 may then be configured to adjust operation of its machine 12 based on information regarding its machines of interest, for example based on proximity, heading, speed, type, etc. The operations may include instructions, recommendations, and/or warnings provided to the operator of its machine 12, and/or autonomous maneuvering of machine 12.

It is contemplated that worksite 10 may be divided into regions, if desired, and the operation of each OC 26 and/or OCC 32 be affected by the distribution of machines 12 within the different regions. For example, it may be possible for OCC 32 to multicast different location listings to different regions of worksite 10, each listing including only those machines 12 found within a common region. Similarly, although the control module 20 of each machine 12 may be capable of receiving messages intended for different regions, OC 26 of each control module 20 may be configured to only process the message corresponding to the current region of its corresponding machine 12. In these ways, the number of and/or complexity of messages sent to any one region and/or processed by any one OC 26 may be reduced. The disclosed tracking system may provide an efficient way to communicate information between a fleet of machines and a central controller. Specifically, because the communications may be unacknowledged, a reduced number communications may be required to sufficiently transmit information. The number of communications may also be reduced because the central controller may communicate simultaneously with the machines via multicast messages. The simultaneous nature of the multicast communications may also provide for quicker communications between the controller and the machines, while also requiring less bandwidth and reduced computing resources.

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A tracking system for a fleet of machines, comprising:

a locating device located on board each machine of the fleet of machines and being configured to determine a current location of an associated machine;

a communicating device located onboard each machine in communication with the locating device; and a central controller located offboard the fleet of machines in communication with each communicating device and configured to:

receive an unacknowledged message from each communicating device relaying the current location of the associated machine, wherein the frequency of the unacknowledged message from each communicating device is based on the speed of the associated machine, the location of the associated machine, or the speed and location of the associated machine;

update a location listing of the fleet of machines with the current location; and repetitively multicast the location listing to the communicating devices.

2. The tracking system of claim 1, wherein each communicating device is configured to repetitively send the unacknowledged message to the central controller.

3. The tracking system of claim 2, wherein the central controller is configured to repetitively multicast the location listing at a first frequency greater than a second frequency at which each communicating device repetitively sends the unacknowledged message.

4. The tracking system of claim 3, further including a machine controller located onboard each machine in communication with an associated communicating device, wherein each machine controller is configured to determine that the unacknowledged message previously sent by the associated communicating device was correctly received by the central controller based on the location listing subsequently multicast by the central controller to each communicating device.

5. The tracking system of claim 4, wherein, when the machine controller determines that the unacknowledged message previously sent by the associated communicating device was not correctly received, the machine controller is configured to cause the associated communicating device to immediately send another unacknowledged message relaying the current location of the associated machine.

6. The tracking system of claim 5, wherein the central controller is further configured to determine that a particular machine of the fleet of machines is out of contact with the central controller when the unacknowledged message has not been received from the communicating device associated with the particular machine for at least a threshold period of time.

7. The tracking system of claim 6, wherein, when the particular machine has been determined to be out of contact, the associated machine controller is configured to cause the associated communicating device to immediately send another unacknowledged message relaying the current location of the particular machine.

8. The tracking system of claim 3, wherein the communicating device is configured to:
- send the unacknowledged message at the second frequency when the associated machine is traveling at a speed less than a threshold speed; and
- send the unacknowledged message at a frequency that increases with an increasing travel speed of the associated machine that is faster than the threshold speed.

9. The tracking system of claim 3, wherein the communicating device is configured to send the unacknowledged message at a frequency that increases with a decreasing proximity of the associated machine to another machine of the fleet of machines.

10. The tracking system of claim 3, wherein the central controller is further configured to determine a long-term communication status for each machine based on comparison of an actual frequency of the unacknowledged message for each machine and an expected frequency.

11. The tracking system of claim 10, wherein the location listing multicast to the fleet of machines further includes the long-term communication status for each of the fleet of machines.

12. The tracking system of claim 10, wherein when the long-term communication status for a particular machine of the fleet of machines is determined to be off for at least a threshold amount of time, the central controller is further configured to stop including the current location of the particular machine in the location listing.

13. The tracking system of claim 12, further including a machine controller located on board each machine in communication with an associated communicating device, wherein each machine controller is configured to store in memory the long-term communication status and location of each machine that is actively operating at a common worksite.

14. The tracking system of claim 13, wherein, when the machine controller includes stored in memory the long-term communication status and location of a particular machine of the fleet of machines that is not included in the location listing multicast by the central controller, the machine controller is further configured to query the central controller regarding the particular machine.

15. The tracking system of claim 13, further including a display located within each machine of the fleet of machines that is manned, the display being configured to display the location of all machines of the fleet of machines based on the multicast location listing.

16. The tracking system of claim 13, wherein each machine controller is configured to:
- determine a subset of the fleet of machines that are located within a threshold proximity to its associated machine of the fleet of machines; and
- implement at least one of a warning and an autonomous machine maneuver based on information within the location listing regarding the subset.

17. The tracking system of claim 1, wherein the location listing further includes locations of stationary infrastructure at a common worksite.

18. The tracking system of claim 1, wherein the central controller is configured to repetitively multicast the location listing to the communicating devices associated with only machines of the fleet of machines located within a particular region of a worksite.

19. A tracking system for a fleet of machines, comprising:
- a locating device located onboard each machine of the fleet of machines and being configured to determine a current location of an associated machine of the fleet of machines;
- a machine controller located onboard each machine;
- a communicating device located onboard each machine in communication with the locating device and the machine controller; and
- a central controller located offboard the fleet of machines in communication with each communicating device, the central controller configured to:
  - repetitively receive at a first frequency an unacknowledged message from each communicating device relaying the current location of the associated machine;
  - update a location listing of the fleet of machines with the current location; and
  - repetitively multicast at a second frequency greater than the first frequency the location listing to each communicating device,
  - wherein the machine controller is configured to:
    - determine that the unacknowledged message previously sent by the associated communicating device was correctly received by the central controller based on the location listing subsequently multicast by the central controller; and
    - determine that the associated machine is out of contact with the central controller when the unacknowledged message has not been received from the locating device for at least a threshold period of time.

20. A tracking system for a fleet of machines, comprising:
- a locating device located onboard each machine of the fleet of machines and being configured to determine a current location of an associated machine;
- a communicating device located onboard each machine in communication with the locating device; and
- a central controller located offboard the fleet of machines in communication with each communicating device and configured to:
  - repetitively receive an unacknowledged message from each communicating device relaying the current location of the associated machine,
    - wherein the frequency of the unacknowledged message from each communicating device is based on the speed of the associated machine, the location of the associated machine, or the speed and location of the associated machine;

update a plurality of different location listings of the fleet of machines with the current location; and repetitively multicast each of the plurality of different location listings to particular communicating devices based on co-location of the associated machines within particular regions of a worksite.

* * * * *